J. F. SCHICKE.
COMBINATION LOCK.
APPLICATION FILED JULY 19, 1918.

1,374,769.

Patented Apr. 12, 1921.
2 SHEETS—SHEET 1.

Inventor:
JOSEF F. SCHICKE,
His Attorney.

J. F. SCHICKE.
COMBINATION LOCK.
APPLICATION FILED JULY 19, 1918.

1,374,769.

Patented Apr. 12, 1921.
2 SHEETS—SHEET 2.

Inventor:
JOSEF F. SCHICKE,
By John N. Brininger
His Attorney.

UNITED STATES PATENT OFFICE.

JOSEF F. SCHICKE, OF ST. LOUIS, MISSOURI, ASSIGNOR TO JOSEF F. SCHICKE, TRUSTEE, OF ST. LOUIS, MISSOURI.

COMBINATION-LOCK.

1,374,769.      Specification of Letters Patent.      Patented Apr. 12, 1921.

Application filed July 19, 1918. Serial No. 245,733.

*To all whom it may concern:*

Be it known that I, JOSEF F. SCHICKE, a citizen of the United States, and residing at St. Louis, Missouri, have invented new and useful Improvements in Combination-Locks, of which the following is a specification.

This invention relates to locks, and more particularly to combination locks adapted for locking automobiles in such a manner as to prevent unauthorized use thereof.

Automobiles are locked in various manners, the two principal ones being by key locks and by the ordinary combination locks employing dials. The employment of dials is, however, impractical, for a lock must frequently be opened at night when the dials cannot be properly positioned.

One of the objects of this invention, therefore, is to provide an automobile lock, especially adapted for locking the steering shaft, which employs a series of tumblers and buttons for controlling the tumblers, which can be readily operated to open the lock.

Another object of this invention is to provide a combination lock employing tumblers and buttons, which is simple in construction, effective in its action and cheap to manufacture.

Further objects will appear from the detail description, taken in connection with the accompanying drawings, in which.

Figure 1:
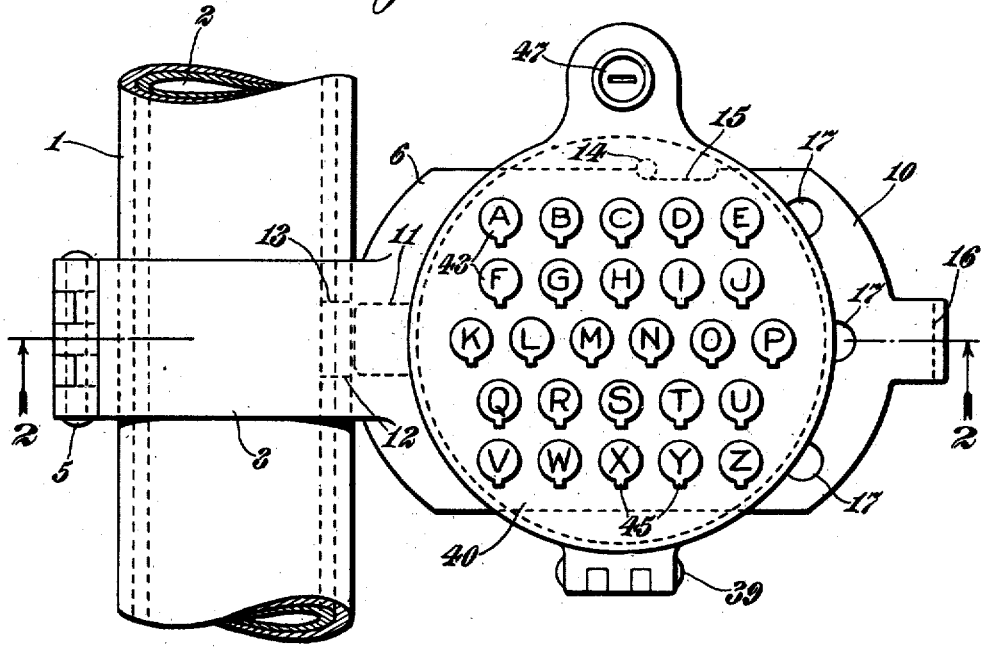
Figure 1 is a face elevation of an automobile lock embodying this invention.

Referring to the accompanying drawings, 1 designates a steering column of an automobile and 2 the hollow steering shaft. The locking device embodying this invention is mounted on the steering column and has a locking bolt adapted to engage the shaft to lock it against movement.

Adapted to be clamped on the steering column and for this purpose, the locking casing is provided with a pair of semi-circular lugs 3 and 4 respectively hinged together at 5 and embracing the steering column. The lugs 3 and 4 are attached to a pair of plates 6 and 7 respectively, which are connected by screws 8, which also act to lock the casing on the steering column. In order to additionally secure the casing on the column, the lug 4 may be threaded to receive a set screw 9 adapted to engage and clamp the column.

Figure 3:
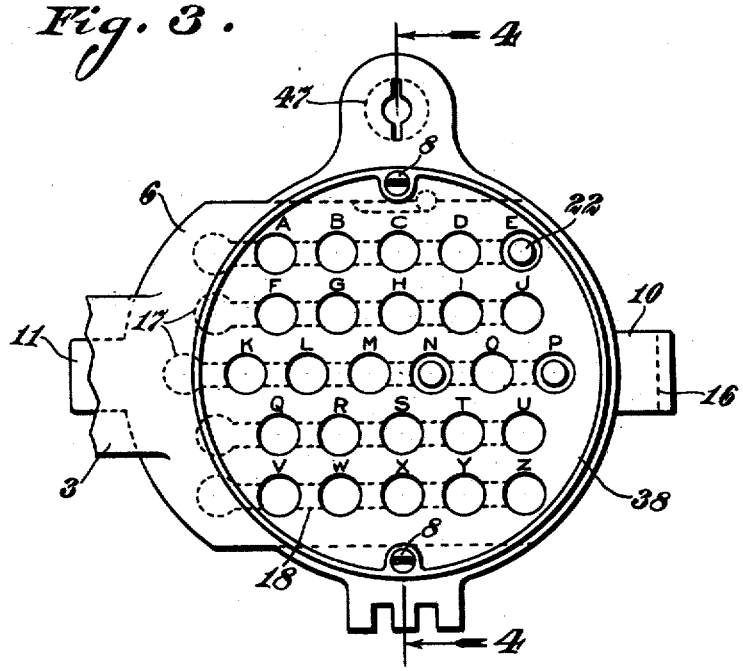
Fig. 3 is an elevation of the lower half of the lock.
Figure 4:
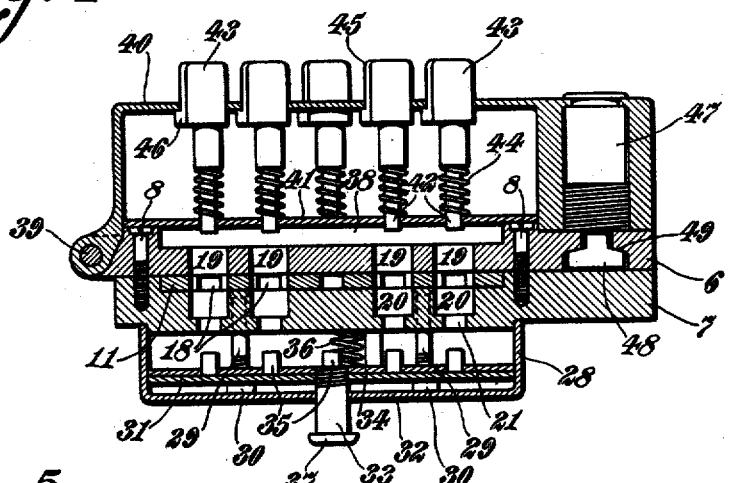
Fig. 4 is a section on the line 4—4, Fig. 3.
Figure 5:
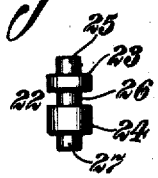
Fig. 5 is a detail of one of the tumblers.

The plate 7 is recessed to receive a controller plate 10 adapted to slide therein, and having an extension 11 forming a bolt adapted to enter the keepers 12 and 13 in the steering column and shaft respectively, so as to securely lock the shaft against movement. The movement of this controller plate is limited by a pin 14 on the plate 6 engaging a slot 15 in the controller plate 10, and this controller plate is provided with a downturned lug 16 whereby it may be shifted to move the bolt into and out of its keepers. The controller plate is provided with a series of recesses 17, circular in form, and having each a connecting channel 18 of smaller width than the diameter of the recesses 17. A series of these recesses and channels are arranged in line (as shown in Fig. 3). The plates 6 and 7 have sets of alining guide ways 19 and 20, the guide ways 20 being reduced in diameter, as shown at 21. These guide ways are adapted to receive tumblers 22, one of which is shown in Fig. 5. This tumbler comprises a cylinder having portions 23 and 24 of the diameter slightly less than the diameter of one of the recesses 17, and having portions 25, 26 and 27 of a diameter slightly less than the width of a channel 18. It will be noted that the length of the portion 23 is less than that of the portion 24. It will, moreover, be noted that the length of the portion 26 is slightly greater than the thickness of the controller plate 10.

A cap 28 is attached to the plate 7 by screws 29 passing through the plate and into lugs 30 attached to the cap. The heads of these screws are located in the plate 7 and under the plate 6 so as to be inaccessible for operation when the plates are together. Arranged within the cap, but spaced from, the end thereof is a plate 31, both the plate 31 and the end 32 of the cap being perforated to form together a guide for a shank 33 connected with a shift plate 34. This shift plate 34 has a series of pins 35 adapted to enter the apertures 21 to engage the tumblers. One or more springs 36 operate to retain the shift plate against the guide plate 31. The shank 33 is provided with an enlarged head or button 37 so as to permit operation of the shift plate.

When the shift plate is moved the limit of its movement and until it engages the bottom face of the plate 7, the pins 35 will enter the apertures 21 and engage the tumblers, so as to move these tumblers to active positions. An active tumbler is shown on the right, Fig. 2, in such a position that, when the tumbler is raised by pressing the button 37, the portion 24 will engage the recess 17 and thereby lock the controller plate 10 against movement. The reverse tumbler (shown in the center, Fig. 2) is, however, thereby moved to such a position that the reduced portion 26 will be arranged opposite the controller plate. At this time this particular tumbler will not restrain movement of the controller plate 10 for the reason that the reduced portion 26 has a diameter slightly less than the channel 18, and, therefore, as far as the presence of this tumbler is concerned, the controller plate can slide. Now it will be noted that the plate 6 is recessed, as shown at 38, so that the ends 25 and 27 of the tumblers are accessible for removal, whereby any tumbler can be placed in any desired position in any of the guide ways 19—20 in the plates 6 and 7.

Pivoted at 39 on the plate 6 is a cap 40, and arranged within the cap is a guide-plate 41 which is apertured to guide the tumbler engaging portions 42 of a series of keys 43 mounted in the cap. There is a key opposite each guide way 19—20 so that when the cap is in position, the depression of a key will operate to move a tumbler, if there is a tumbler in the corresponding guide way. Each key shank is provided with a spring 44 which operates to move the keys to inoperative positions, the keys being prevented from turning by ribs 45 engaging corresponding key ways in the cap and the movement of the keys to inoperative position, being limited by enlargements 46 on these ribs. These keys may be provided with any suitable designations thereon, such as letters, as shown in Fig. 1, but they may be provided with numerals. In order to securely lock the cap in position, this cap is provided with a suitable lock 47, such as a cylinder lock, having a bolt 48 engaging a corresponding keeper 49 in the plate 6.

Figure 2:
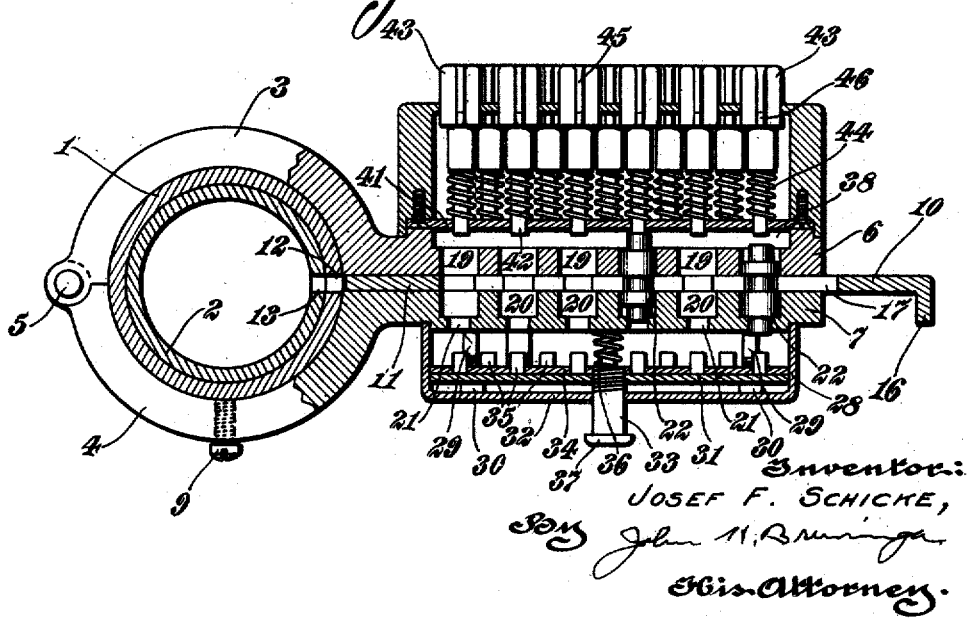
Fig. 2 is a section on the line 2—2, Fig. 1.

Assuming the lock to be in position on the steering column with the bolt in operative locking position as shown in Fig. 3, and with three tumblers in the relative position shown in that figure, that is, occupying the guide ways corresponding to the letters E, N and P, the tumblers E and P being in the position shown in the right, Fig. 2, so that when the tumblers are moved up by pressing button 37 the enlarged portions 24 will be engaged with the recesses 17 and with the tumbler N in the position shown at the center, Fig. 2, that is, with the reduced portion 26 opposite the channel 18, the tumblers E and P will operate to lock the controller plate 10 in locking position. It will be understood that there is a close fit between the tumblers and their respective guide ways 19 and 20, so that when these tumblers are placed in any position in their guide ways, they will be retained in those positions on account of the frictional engagement. It will, of course, be understood that since the steering post is nearly vertical, the tumblers will practically be in a horizontal position so that there is no tendency to shift these tumblers. It will, of course, be understood that in order to unlock the controller plate, it is necessary that the tumblers E and P be shifted further into the plate 7 until the reduced portions 26 thereof come opposite the controller plate and the channel 18 therein. If, however, the tumbler N is moved, then the enlarged portion 24 will move into the recess 17 in the controller plate so as to lock this plate against movement, even though the tumblers E and P be moved to inactive positions. It will, therefore, be seen that in order to lock the controller plate or element 10, it is necessary to shift the tumblers E and P, but the tumbler N should be left undisturbed. Consequently, the combination is with the position of the tumblers as shown in E and P and the tumbler N is simply placed in inverted position to complicate the combination.

When the chauffeur desires to unlock the automobile, he will depress the buttons E and P and this will operate to shift the corresponding tumblers to inactive positions, thereby releasing the controller plate. If, however, he should also depress the button N, the controller plate will not be unlocked. Assuming that only the buttons E and P have been depressed so that the controller plate is released, by grasping the lug 16, the controller plate can be moved to withdraw the bolt 11 from the keeper 13, thereby releasing the steering wheel. It will be noted that the controller plate can be moved an amount sufficient to move the next set of recesses in alinement with the tumblers, and by operating the knob or button 37, the tumblers will again be moved to active positions to lock the controller plate in inactive position, so that the automobile cannot be locked by anyone, but one who knows the combination. When it is again desired to lock the automobile, the buttons E and P are again depressed, the controller plate moved to the left, Figs. 1 and 2, and the steering wheel rotated until the bolt 11 can again be slipped into the keeper 13, and then by operating the button 37, the tumblers can then again be moved to active positions to lock the controller plate.

When the automobile owner desires to change the combination, the lock 47 is opened by a suitable key, the cap 40 is swung on its pivot 39 so as to expose the tumblers, and these tumblers can then be placed in any suitable positions in selected guide ways. In practice, the key for the lock 47 will be carried by the automobile owner, so that the chauffeur cannot change the combination of the lock. It will also be noted that the screws 8 are only accessible for operation after the cap 40 has been unlocked and opened so that no one but the holder of the key for the lock 47 can detach the locking device from the automobile.

It will, therefore, be seen that the invention accomplishes its objects. An automobile lock is produced which is simple in construction, effective in its action, and exceedingly cheap to manufacture, and a large number of combinations may be obtained with a small number of tumblers. The lock can be readily attached to any automobile, and when in position will securely lock the same against unauthorized use. In view of the fact that the combination is obtained by a series of buttons, the lock can be opened and closed in the dark, and by touch.

It is obvious that various changes may be made in the details of construction without departing from the spirit of this invention; it is to be understood that this invention is not to be limited to the specific construction shown and described.

Having thus described the invention, what is claimed is:

1. In a combination lock, a bolt, a controller plate having a series of enlarged tumbler-receiving recesses connected by restricted channels, and a plurality of invertible tumblers coöperating therewith, adapted to lock said bolt in locking or unlocking position.

2. In a combination lock, a pair of hinged plates adapted to embrace a column, locking mechanism carried by said plates, means for fastening said plates on said column, and locking means adapted to secure said fastening means including a cover and a lock adapted to secure said cover.

3. In a combination lock, a pair of hinged plates adapted to embrace a column, means for locking said plates on said column including means for fastening said plates, a cover for said fastening means and a lock adapted to secure said cover, a bolt adapted to lock said column, and means for locking said bolt in locking or unlocking position.

4. In a combination lock, a pair of hinged plates adapted to embrace a column, means for locking said plates on said column, a bolt, a controller plate having a series of enlarged tumbler-receiving recesses connected by restricted channels and a plurality of invertible tumblers coöperating with said controller plate to lock said bolt in locking or unlocking position.

5. In a combination lock, a pair of hinged plates adapted to embrace a column, a plurality of guide ways in said plates, tumblers in said guide-ways, a bolt, and a controller plate adapted to coöperate with said tumblers to lock said bolt.

6. In a combination lock, a pair of hinged plates adapted to embrace a column, a plurality of guide ways in said plates, tumblers in said guide-ways, a bolt, and a controller plate adapted to coöperate with said tumblers to lock said bolt in locking or unlocking position.

7. In a combination lock, a pair of hinged plates adapted to embrace a column, guide ways in one of said plates, guide ways in the other of said plates, said guide ways being adapted for alinement with each other when said plates are in position on said column, tumblers in said guide ways, a bolt, and means for controlling the positions of said tumblers to lock said bolt.

8. In a combination lock, a pair of hinged plates adapted to embrace a column, guide ways in one of said plates, guide ways in the other of said plates, said guide ways being adapted for alinement with each other when said plates are in position on said column, tumblers in said guide ways, a bolt, and means for controlling the positions of said tumblers to lock said bolt, a casing for said controlling means and means for locking said casing.

In testimony whereof I affix my signature this 23 day of February, 1918.

JOSEF F. SCHICKE.